UNITED STATES PATENT OFFICE.

HEINRICH TITZE, OF VIENNA, AUSTRIA-HUNGARY.

PROCESS OF PRODUCING IMITATIONS OF PAINTINGS ON GLASS.

SPECIFICATION forming part of Letters Patent No. 718,036, dated January 6, 1903.

Application filed July 15, 1901. Serial No. 68,338. (No specimens.)

*To all whom it may concern:*

Be it known that I, HEINRICH TITZE, a subject of the Emperor of Austria-Hungary, residing at Vienna, Austria-Hungary, have invented a new and useful Process of Producing Imitations of Paintings on Glass, of which the following is a specification.

Hitherto pictures on glass were either painted by hand or else the drawing intended for transfer to the glass was printed with ordinary lithographic-printing ink on a suitable paper, the picture then transferred to the glass, and varnished over. So-called "diaphonous pictures" were also put on the market, the nature of which consisted in a drawing printed by means of lithographic ink on transparent paper, which paper was then pasted on the glass and varnished over. Imitations of paintings on glass produced in this manner have the disadvantage of fading soon, while atmospheric influences make the varnish crack, carrying with it a portion of the coloring, hence of the paper, and, finally, the pictures are easily injured while being cleaned. These disadvantages are removed by the present process, whose nature consists in the subsequent burning in of the pictures drawn on the glass by mechanical means with transparent glass-paints.

The production of the paintings on glass according to the present process is as follows: To the usual lithographic varnish, in order to increase its adhesive power, are added colophonium and Venetian turpentine, (a good proportion is one thousand parts of varnish, four hundred parts of colophonium, and one hundred parts of Venetian turpentine,) which mixture is boiled, afterward cooled off, and ground up with transparent vitrifiable paint, such as is used for painting on glass. This mixture is laid in the usual manner on a printing-cylinder and rolled into the drawing on the stone, whereupon the paint is transferred to metachromotype paper or Englsh printing tissue-paper. The still damp impression is powdered with dry finely-pulverized transparent paint and the latter dusted off from the imprint with a fine hair-pencil, whereupon it is left to dry, and any possibly missing parts of the drawing are replaced with the above mixture of paint. Then the imprint is cleaned with cotton or the like. In similar manner the other colors are transferred to the paper until the whole picture on it is complete.

The glass to which the pictures are to be transferred is covered with "dammar" or a similar varnish diluted with turpentine, and when this is half-dry the paper pressed on the glass. Thereupon the glass is laid into clean water and the paper removed, the colors of the paint remaining on the glass. The latter is now well rinsed, dried, and subjected to the burning process in a muffle-furnace.

In order to intensify the picture obtained, the glass plate is treated as above described twice, or even several times, according to need, and again burned in the muffle-furnace.

I claim—

The herein-described process for producing imitations of paintings on glass consisting in preparing a design upon a lithographic stone, placing on a printing-roller a coating consisting of transparent vitrifiable paint in which has been ground a cooled mixture of lithographic varnish, colophonium and Venetian turpentine boiled together, rolling this coating into the design upon the stone, transferring to metachromotype paper, powdering this imprint with pulverized transparent paint, dusting off the superfluous powder, coating the glass with diluted varnish, impressing the prepared paper upon the glass when the varnish has partially dried, water-soaking the paper off the glass, and finally rinsing, drying and burning the glass as described.

In testimony whereof I affix my signature in presence of two witnesses.

HEINRICH TITZE.

Witnesses:
C. B. HURT.
ALVESTO S. HOGUE.